(No Model.)
T. A. EDISON.
DEPOSITING CELL FOR PLATING THE CONNECTIONS OF ELECTRIC LAMPS, &c.
No. 248,436. Patented Oct. 18, 1881.
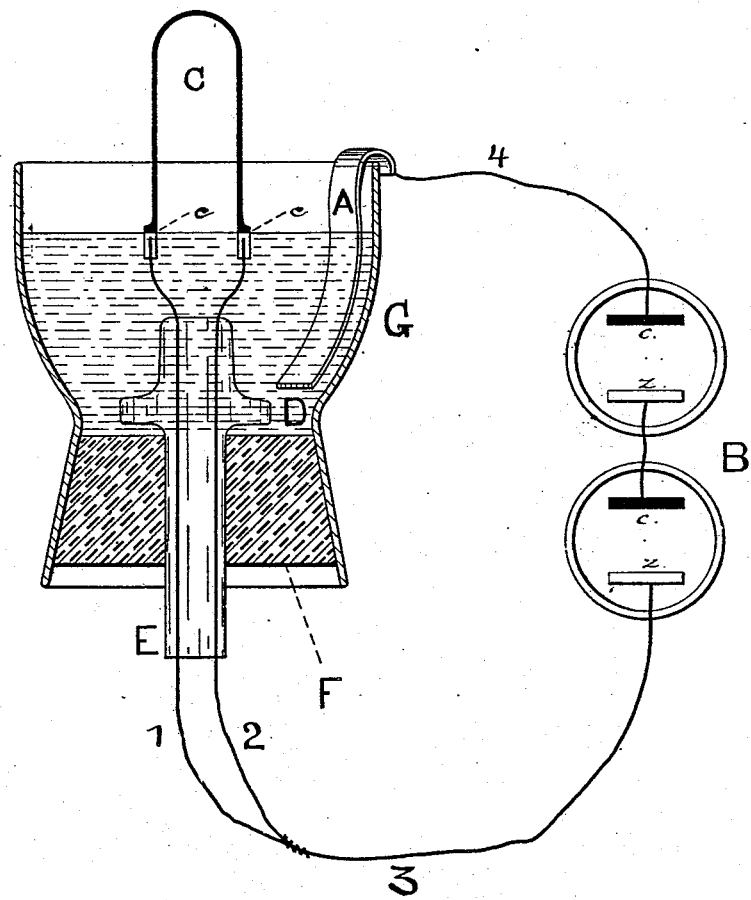
ATTEST:
D. D. Mott
H. W. Seely.
INVENTOR:
T. A. Edison
per Dyer & Wilber
Attys.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

DEPOSITING-CELL FOR PLATING THE CONNECTIONS OF ELECTRIC LAMPS, &c.

SPECIFICATION forming part of Letters Patent No. 248,436, dated October 18, 1881.

Application filed May 27, 1881. (No model.)

*To all whom it may concern:*

Be it known that I, THOMAS A. EDISON, of Menlo Park, in the county of Middlesex and State of New Jersey, have invented a new and useful Improvement in Depositing-Cells for Plating the Connections of Electric Lamps; and I do hereby declare that the following is a full and exact description of the same, reference being had to the accompanying drawing, and to the letters of reference marked thereon.

The object I have in view is to produce a simple and efficient depositing-cell more especially designed for electroplating the connections between the carbon and the leading-in wires of an incandescing electric lamp, which cell will permit of the ready adjustment of the wire-support, so that the point of plating can be controlled. This I accomplish by providing the cell with a perforated stopple, made preferably of some yielding material—such as soft rubber—through which the glass wire-support is pushed from above, the stopple making a tight connection therewith. The cell is then filled to the desired height with the plating solution, and the glass wire-support is adjusted vertically in the stopple, so that the solution will not rise above the connections of the carbon and wires. The leading-in wires of the lamp are then connected with the zinc plate of a battery or with the negative pole of any other suitable generator, while the positive pole of the battery or other generator is connected with an electrode immersed in the solution, this latter electrode forming the anode of the cell while the connections of carbon and wires form the cathode. When the connections have been plated sufficiently heavy to make them secure the solution is drawn off, the wires disconnected from the battery, and the glass wire-support carrying the wires and carbon removed from the stopple. The leading-in wires from the points it is desired to plate down to the top of the glass support may first be covered with varnish, wax, or some other substance to prevent deposition thereon, or they may be left uncoated and deposition proceed thereon. This cell can be multipled to any desired extent, so that a large number of connections can be plated at the same time, a yielding stopple being provided for each glass support.

In the drawing the figure represents a vertical section of the depositing-cell with the glass wire-support in position therein.

G is the depositing-cell, made open at the bottom or having an opening of sufficient size made therethrough, a rubber or other suitable stopple, F, being used to close the orifice.

E is the glass supporting-tube, such as is used in my lamps to receive the conducting-wires 1 2, which are sealed therein, the tube being provided with the enlargement D, for sealing into the neck of the inclosing globe or bulb of the lamp. At their upper ends the wires 1 2 are secured to the carbon C at the enlarged or clamping ends *c c* by any desirable means—as, for instance, by flattening out the wires at their ends and wrapping them around the carbon. The tube E is then passed through the aperture in the stopple F, the wires below the connections being covered with varnish, wax, or other substance preventing deposition thereon. The cell is then filled to the desired height with the plating solution, as shown, and the tube is adjusted vertically in the stopple, so as to bring the connections to the surface of the solution. Connections 3 4 are then made to the wires 1 2, and to the plate from any suitable source of electricity, a battery, B, being, for ease of illustration, shown in the drawing. The plate A forms the anode, and the ends *c c* the cathode, of the depositing-cell. In multiplying this cell a shallow tank can be provided with a large number of perforated elastic stopples, each adapted to receive one of the glass wire-supports, which, after the solution is poured into the cell, are all adjusted to the proper height. The connections of 1 and 2 of all the carbons are then made with a source of electricity and the connections of carbon and wires plated. The solution is drawn off from the tank before the glass supports are removed from position in the stopples.

I do not claim herein the method described of securing the wires to the carbon or the combination of the carbon and wires secured in this manner, the same being the subject-matter of an application before filed by me.

What I claim is—

1. An electroplating-cell provided with a perforated bottom for receiving the support of the article to be plated, and allowing the adjustment of such support through said bottom, so that the point of plating may be controlled, substantially as set forth.

2. An electroplating-cell provided with one or more perforated elastic stopples for receiving the supports of the article or articles to be plated, substantially as set forth.

This specification signed and witnessed this 17th day of May, 1881.

THOMAS A. EDISON.

Witnesses:
 WM. H. MEADOWCROFT,
 H. W. SEELY.